(12) United States Patent
Zhijian

(10) Patent No.: US 12,004,617 B2
(45) Date of Patent: Jun. 11, 2024

(54) TROLLEY CASE WITH A CHARGING DEVICE

(71) Applicant: Li Zhijian, Fujian (CN)

(72) Inventor: Li Zhijian, Fujian (CN)

( * ) Notice: Subject to any disclaimer, the term of this patent is extended or adjusted under 35 U.S.C. 154(b) by 1027 days.

(21) Appl. No.: 16/608,232

(22) PCT Filed: Apr. 13, 2018

(86) PCT No.: PCT/CN2018/082916
§ 371 (c)(1),
(2) Date: Oct. 25, 2019

(87) PCT Pub. No.: WO2018/196629
PCT Pub. Date: Nov. 1, 2018

(65) Prior Publication Data
US 2021/0093059 A1 Apr. 1, 2021

(30) Foreign Application Priority Data
Apr. 27, 2017 (CN) .............................. 201710287785

(51) Int. Cl.
*A45C 13/00* (2006.01)
*A45C 5/04* (2006.01)
(Continued)

(52) U.S. Cl.
CPC .............. *A45C 13/001* (2013.01); *A45C 5/04* (2013.01); *A45C 5/14* (2013.01); *A45C 13/262* (2013.01);
(Continued)

(58) Field of Classification Search
CPC ............ A45C 113/28; A45C 2013/267; A45C 11/0007; A45C 13/262; A45C 13/007;
(Continued)

(56) References Cited

U.S. PATENT DOCUMENTS

2017/0290401 A1\* 10/2017 Bhatnagar .............. A45C 13/28
2018/0000215 A1\* 1/2018 Korey ................ A45C 13/1023

FOREIGN PATENT DOCUMENTS

CN 201709613 1/2011
CN 201905381 7/2011
(Continued)

*Primary Examiner* — Sue A Weaver
(74) *Attorney, Agent, or Firm* — Lippes Mathias LLP

(57) ABSTRACT

The present invention is directed to a trolley case with a charging device, which comprises a case body, a pull rod frame mounted on the case body and a traveling wheel mechanism installed at the bottom of the case body; the pull rod frame is provided with a telescopic pull rod used for dragging the case body, the pull rod frame is provided with a charger accommodating cavity positioned in the middle of the pull rod and used for placing a charging device, the upper part of the charger accommodating cavity is provided with an opening, sliding chutes are arranged on both sides of the opening, and a sliding cover used to cover or open the opening is slidably arranged in the sliding chutes. The independent storage position of the external charging device of the present invention is convenient for taking the charging device at any time, and the setting of the sliding cover prevents the charging device from falling out easily; the spring can eject the charging device and can make the charger accommodating cavity adapted to charging devices of various specifications, the specifications of the charging device are proportional to the compression deformation of the spring, the larger the charging device is, the more greatly the spring is compressed, and the smaller the charging device is, the more slightly the spring is compressed.

11 Claims, 3 Drawing Sheets

(51) Int. Cl.
*A45C 5/14* (2006.01)
*A45C 13/26* (2006.01)
*G01G 19/02* (2006.01)
*G01G 23/36* (2006.01)

(52) U.S. Cl.
CPC ........... G01G 19/021 (2013.01); G01G 23/36 (2013.01); *A45C 2013/267* (2013.01)

(58) Field of Classification Search
CPC .... A45C 5/04; A45C 5/14; A45C 3/00; A45C 13/28; A45C 13/001; G01G 19/021; G01G 23/36
See application file for complete search history.

(56) References Cited

FOREIGN PATENT DOCUMENTS

| | | | |
|---|---|---|---|
| CN | 204317760 U | 5/2015 | |
| CN | 205030674 U | 2/2016 | |
| CN | 205098661 | 3/2016 | |
| CN | 205597364 | 9/2016 | |
| CN | 205728589 | 11/2016 | |
| CN | 205757764 | 12/2016 | |
| CN | 106963079 | 7/2017 | |
| CN | 206880266 U | 1/2018 | |
| DE | 202011005668 U1 | 12/2011 | |
| DE | 202017101957 U1 * | 6/2017 | ............. A45C 13/18 |

* cited by examiner

TROLLEY CASE WITH A CHARGING DEVICE

TECHNICAL FIELD

The present invention relates to the technical field of trolley cases, in particular to a trolley case with a charging device.

BACKGROUND ART

The common trolley case in the market usually only has the simple function of storing luggage. People put all their luggage therein when they take the trolley case for travel or business trip. However, with the more and more frequent use of electronic equipment, the demand of electronic equipment for power supply is increasing. If you go out for a long time, the mobile phone you carry will need to be charged from time to time. Now there are mobile power supplies such as Charge Pal to realize real-time charging function. However, when people go out, Charge Pal can only be placed in the trunk, resulting in the need to take out the Charge Pal from the trunk to charge the mobile phone, thus wasting time. Moreover, it is very inconvenient to take the Charge Pal out of the trunk when checking.

CONTENTS OF THE INVENTION

The purpose of the present invention is to provide a trolley case with a charging device, which is convenient to take the charging device at any time due to the storage position of the external charging device, and the sliding cover arrangement makes the charging device difficult to fall out.

The technical scheme adopted by the present invention is as follows: a trolley case with a charging device comprises a case body, a pull rod frame mounted on the case body and a traveling wheel mechanism installed at the bottom of the case body; the pull rod frame is provided with a telescopic pull rod used for dragging the case body, the pull rod frame is provided with a charger accommodating cavity positioned in the middle of the pull rod and used for placing a charging device, the upper part of the charger accommodating cavity is provided with an opening, sliding chutes are arranged on both sides of the opening, and a sliding cover used to cover or open the opening is slidably arranged in the sliding chutes.

Further, in order to fasten the sliding cover, elastic lugs are arranged on both sides of the sliding cover, and protrusions matched with the elastic lugs for limiting and locking the sliding cover are arranged on the inner side of the inner wall of the sliding chutes, The outer side of the inner wall of the sliding chute is provided with a lug for preventing the sliding cover from completely sliding out of the sliding chute, and the outer side of the sliding cover is provided with an arc-shaped protrusion for pulling the sliding cover.

Further, the setting of the spring is convenient to take the charging device, and the charger accommodating cavity can therefore be adapted to charging devices of various specifications, and the specifications of the charging device are proportional to the compression deformation of the spring; the bottom of the charger accommodating cavity is provided with an elastic piece accommodating cavity for installing an elastic piece, and a spring for ejecting the charging device is arranged in the elastic piece accommodating cavity.

Further, in order to prevent the charging device from being impacted, buffer foam for preventing the charging device from being impacted is mounted on the inner wall of the charger accommodating cavity.

Further, umbrellas usually cannot be checked in during customs luggage inspection, so umbrellas are usually stored separately. To provide a cavity for storing umbrellas, the case body is provided with an umbrella groove for placing umbrellas.

Further, in order to provide charging convenience in a state where the sliding cover is closed, the sliding cover is provided with a charging port which is used for inserting a USB connector. When charging, the mobile phone can also be placed in the umbrella slot, which is more convenient.

Further, in order for the traveling wheel to move by itself, the traveling wheel mechanism comprises a front traveling wheel set arranged at both ends of the front side of the bottom of the case body and a rear traveling wheel set arranged at both ends of the rear side of the bottom of the case body, the rear traveling wheel set is provided with a driving mechanism for driving the rear traveling wheel set to roll, and the driving mechanism is connected with a button arranged on the case body for controlling the switch thereof.

Further, in order to drive the rear traveling wheel set to move, the front traveling wheel set is a universal wheel, the rear traveling wheel set is a directional wheel, the rear traveling wheel set comprises two rear traveling wheels respectively arranged at two ends of the rear side of the case body and a rotating shaft fixedly connected with the two rear traveling wheels, a connecting shaft is fixedly arranged at the bottom of the case body, the lower end of the connecting shaft is connected with the rotating shaft through a bearing, the rotating shaft is coaxially provided with a first sprocket, the driving mechanism comprises a driving motor arranged at the bottom of the case body and an output sprocket arranged on the driving motor, and the output sprocket is rotatably connected with the first sprocket to drive the first sprocket to rotate so as to drive the rear traveling wheel to roll.

Further, in order to realize the self-generating function, a micro generator is arranged at the bottom of the trolley case, and the micro generator is electrically connected with the charging device so as to store electric energy in the charging device; the rotating shaft is also coaxially provided with a second sprocket, the micro generator is provided with an input sprocket, and the second sprocket is rotatably connected with the input sprocket to drive the input sprocket to rotate so as to drive the micro generator to generate electricity.

Further, in order to provide the luggage weight measurement function, the trolley case also comprises a pressure sensor for measuring the weight of the trolley case, a controller and a display, wherein the pressure sensor is electrically connected with the controller for transmitting pressure signals to the controller, and the controller is electrically connected with the display for displaying the pressure signals received from the pressure sensor. The middle of the bottom of the case body is rotatably provided with a measuring block, the pressure sensor is installed on the measuring block, the height of the measuring block is higher than the height of the traveling wheel mechanism so as to facilitate the traveling wheel mechanism to leave the ground when the measuring block is folded down.

In order to facilitate quick recovery when luggage is lost, a GPS positioning module is also arranged in the case body.

Compared with the prior art, the present invention has the following advantages:

(1) The separate storage position of the external charging device of the present invention is convenient to take the charging device at any time, and the sliding cover arrangement makes the charging device difficult to fall out;

(2) The spring in the present invention can eject the charging device and can make the charger accommodating cavity adapted to charging devices of various specifications, the specifications of the charging device are proportional to the compression deformation of the spring, the larger the charging device is, the more greatly the spring is compressed, and the smaller the charging device is, the more slightly the spring is compressed;

(3) According to the present invention, a pressure sensor is arranged to provide a luggage weight measurement function, and a traveling wheel mechanism with a driving mechanism is arranged to realize the self-moving of the trolley case.

DESCRIPTION OF THE DRAWINGS

The present invention will be further described with reference to the drawings and embodiment.

In the diagrams:

1—case body; 2—front traveling wheel set; 3—rear traveling wheel set; 4—umbrella groove; 5—pull rod frame; 501—pull rod; 502—sliding cover; 5021—elastic lug; 5022—arc-shaped protrusion; 503—charger accommodating cavity; 504—elastic piece accommodating cavity; 505—charging port; 506—sliding chutes; 5061—protrusion; 5062—lug; 507—buffer foam; 508—spring; 6—display; 7—measuring block; 8—pressure sensor.

SPECIFIC EMBODIMENT MODE

The following is a detailed description of the present invention with reference to the drawings attached to the specification and specific embodiment.

Figure 1:
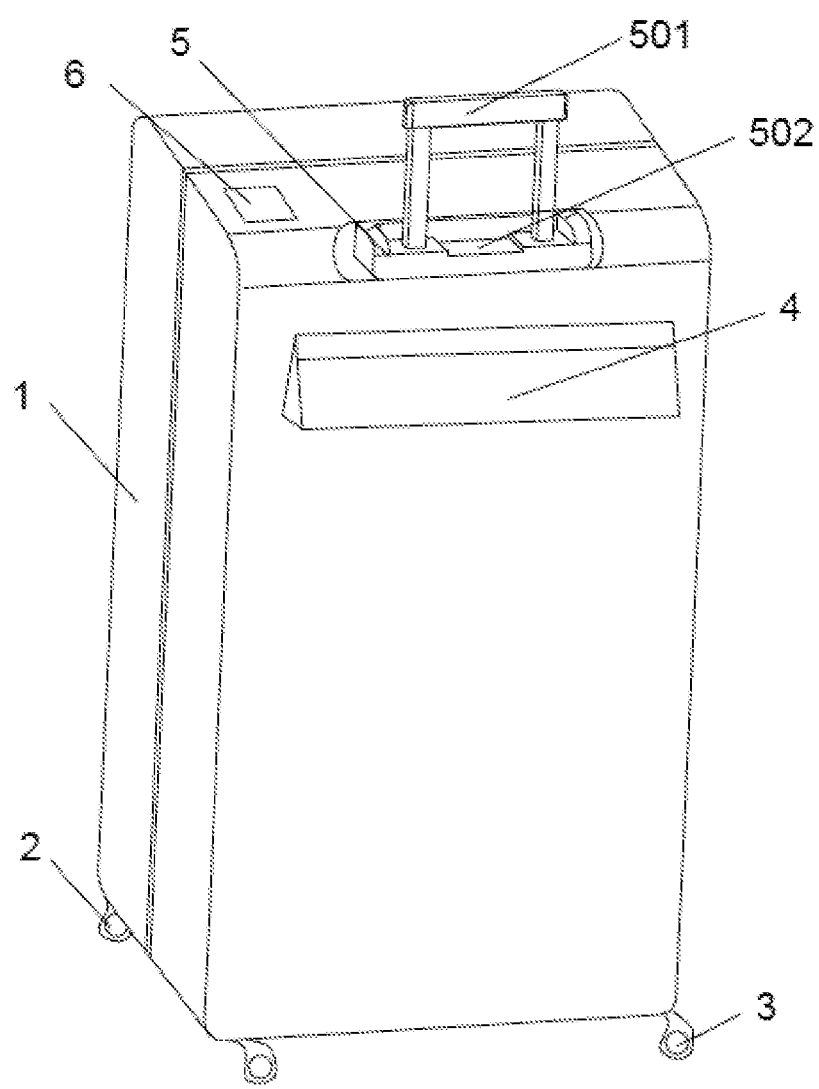
FIG. 1 is a schematic structural diagram of the present invention.
Figure 2:
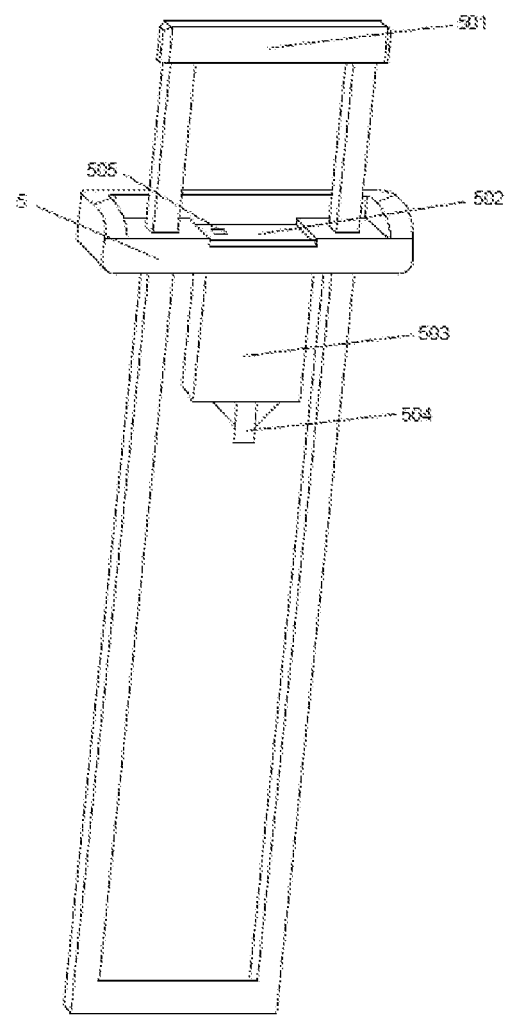
FIG. 2 is a schematic structural diagram of the pull rod frame.
Figure 3:
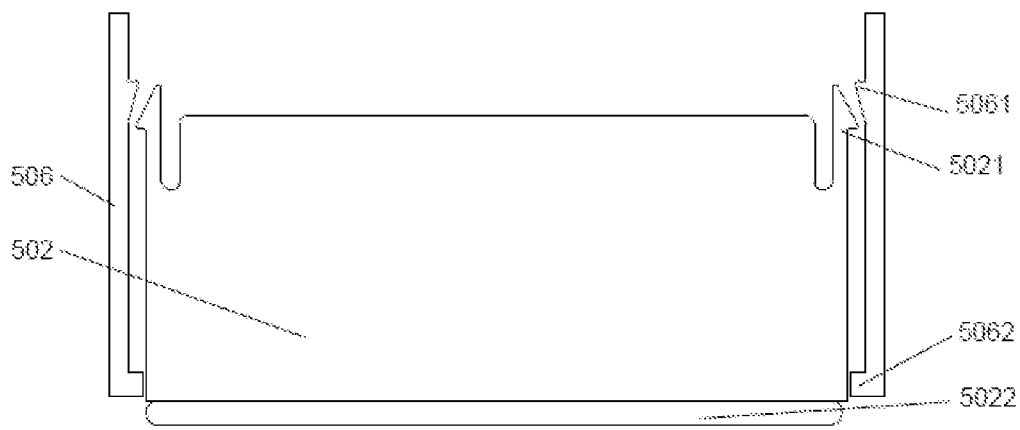
FIG. 3 is a schematic diagram of the connection between the sliding cover and the sliding chutes.
Figure 4:
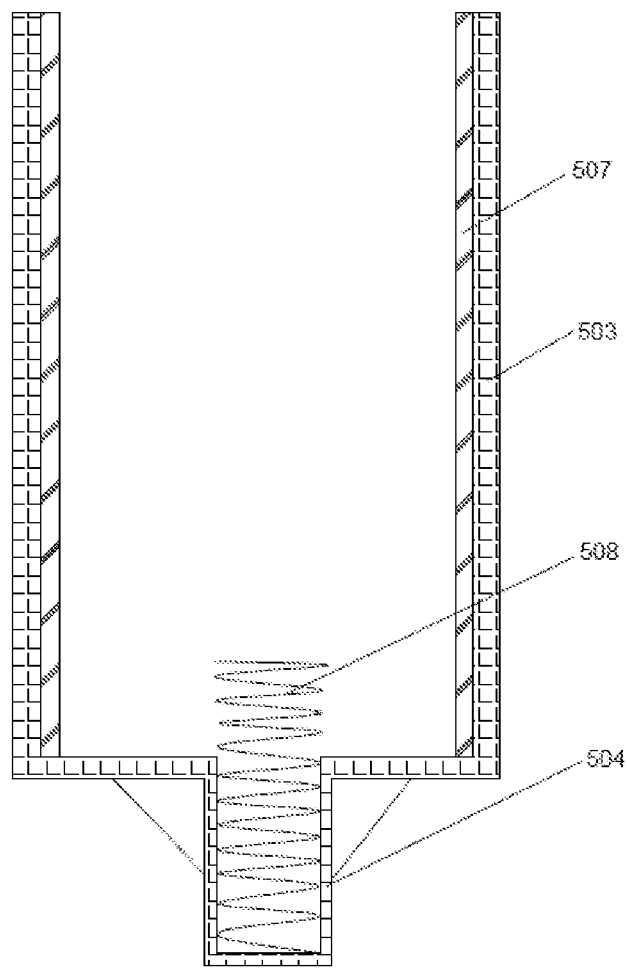
FIG. 4 is a schematic structural diagram of the charger accommodating cavity.
Figure 5:
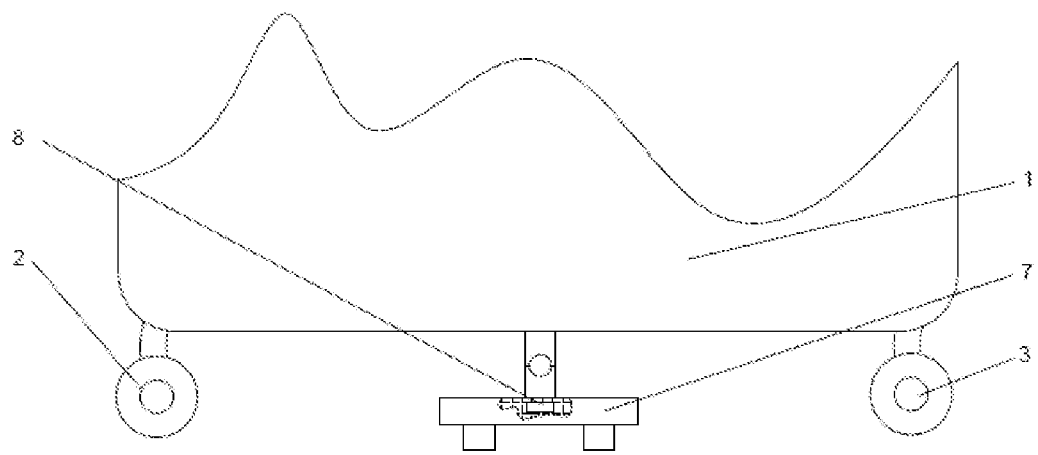
FIG. 5 is a schematic structural diagram of the measuring block.

As shown in FIGS. 1-5, this embodiment provides a trolley case with a charging device, which comprises a case body 1, a pull rod frame 5 mounted on the case body 1 and a traveling wheel mechanism installed at the bottom of the case body 1; the pull rod frame 5 is provided with a telescopic pull rod 501 used for dragging the case body 1, the pull rod frame 5 is provided with a charger accommodating cavity 503 positioned in the middle of the pull rod 501 and used for placing a charging device, the upper part of the charger accommodating cavity 503 is provided with an opening, sliding chutes 506 are arranged on both sides of the opening, and a sliding cover 502 used to cover or open the opening is slidably arranged in the sliding chutes 506.

In this embodiment, in order to fasten the sliding cover 502, elastic lugs 5021 are arranged on both sides of the sliding cover 502, and protrusions 5061 matched with the elastic lugs 5021 for limiting and locking the sliding cover 502 are arranged on the inner side of the inner wall of the sliding chutes 506, The outer side of the inner wall of the sliding chute 506 is provided with a lug 5062 matched with the elastic protrusions 5021 for preventing the sliding cover 502 from completely sliding out of the sliding chute 506, and the outer side of the sliding cover 502 is provided with an arc-shaped protrusion 5022 for pulling the sliding cover 502.

In this embodiment, the setting of the spring 508 is convenient to take the charging device, and the charger accommodating cavity 503 can therefore be adapted to charging devices of various specifications. The specifications of the charging device are proportional to the compression deformation of the spring 508. The bottom of the charger accommodating cavity 503 is provided with an elastic piece accommodating cavity 504 for installing an elastic piece, and a spring 508 for ejecting the charging device is arranged in the elastic piece accommodating cavity 504.

In this embodiment, in order to prevent the charging device from being impacted, buffer foam 507 for preventing the charging device from being impacted is mounted on the inner wall of the charger accommodating cavity 503.

In this embodiment, umbrellas usually cannot be checked in during customs luggage inspection, so umbrellas are usually stored separately. To provide a cavity for storing umbrellas, the case body 1 is provided with an umbrella groove 4 for placing umbrellas.

In this embodiment, in order to provide charging convenience in a state where the sliding cover 502 is closed, the sliding cover 502 is provided with a charging port 505 which is used for inserting a USB connector. When charging, the mobile phone can also be placed in the umbrella slot 4, which is more convenient. The sliding cover 502 is also provided with a charging hole for inserting a charging wire to facilitate charging the charging device.

In this embodiment, in order for the traveling wheel to move by itself, the traveling wheel mechanism comprises a front traveling wheel set 2 arranged at both ends of the front side of the bottom of the case body 1 and a rear traveling wheel set 3 arranged at both ends of the rear side of the bottom of the case body 1, the rear traveling wheel set 3 is provided with a driving mechanism for driving the rear traveling wheel set 3 to roll, and the driving mechanism is connected with a button arranged on the case body 1 for controlling the switch thereof. When in use, the button is pressed, the driving mechanism starts to work, the rear traveling wheel set 3 is driven to rotate, and the trolley case moves by itself.

In this embodiment, in order to drive the rear traveling wheel set 3 to move, the front traveling wheel set 2 is a universal wheel, the rear traveling wheel set 3 is a directional wheel, the rear traveling wheel set 3 comprises two rear traveling wheels respectively arranged at two ends of the rear side of the case body 1 and a rotating shaft fixedly connected with the two rear traveling wheels, a connecting shaft is fixedly arranged at the bottom of the case body 1, the lower end of the connecting shaft is connected with the rotating shaft through a bearing, the rotating shaft is coaxially provided with a first sprocket, the driving mechanism comprises a driving motor arranged at the bottom of the case body 1 and an output sprocket arranged on the driving motor, and the output sprocket is rotatably connected with the first sprocket to drive the first sprocket to rotate so as to drive the rear traveling wheel to roll.

In this embodiment, in order to realize the self-generating function, a micro generator is arranged at the bottom of the case body 1, and the micro generator is electrically connected with the charging device so as to store electric energy in the charging device; the rotating shaft is also coaxially provided with a second sprocket, the micro generator is provided with an input sprocket, and the second sprocket is rotatably connected with the input sprocket to drive the input sprocket to rotate so as to drive the micro generator to generate electricity.

In this embodiment, in order to provide the luggage weight measurement function, the trolley case further comprises a pressure sensor 8 for measuring the weight of the trolley case, a controller and a display 6, wherein the pressure sensor 8 is electrically connected with the controller for transmitting pressure signals to the controller, and the controller is electrically connected with the display 6 for displaying the pressure signals received from the pressure sensor 8. The middle of the bottom of the case body 1 is rotatably provided with a measuring block 7, the pressure sensor 8 is installed on the measuring block 7, the height of the measuring block 7 is higher than the height of the traveling wheel mechanism so as to facilitate the traveling wheel mechanism to leave the ground when the measuring block 7 is folded down, and the display 6 is arranged on the case body 1.

In this embodiment, in order to facilitate quick recovery when luggage is lost, a GPS positioning module is also arranged in the case body 1.

In this embodiment, when in use, the Charge Pal is directly put into the charger accommodating cavity 503. The spring 508 of the elastic piece accommodating cavity 504 can automatically adjust the size of the elastic piece accommodating cavity 504 according to the size of the Charge Pal to adapt to the Charge Pal. After the Charge Pal is placed, the sliding cover 502 is covered, and the elastic lug 5021 is matched with the protrusion 5061, so that the sliding cover 502 is closed tightly, and the buffer foam 507 can be buffered to reduce the vibration generated when the trolley case moves.

The preferred embodiment above has further explained in detail the purpose, technical scheme and advantages of the present invention. It should be understood that the said embodiment is only a preferred embodiment of the present invention and is not intended to limit the present invention. Any modification, equivalent substitution, improvement, etc. made within the spirit and principles of the present invention should be included in the scope of protection of the present invention.

I claim:

1. A trolley case with a charging device, comprising:
a case body, a pull rod frame mounted on the case body and a traveling wheel mechanism installed at the bottom of the case body; the pull rod frame is provided with a telescopic pull rod used for dragging the case body, the pull rod frame is provided with a charger accommodating cavity positioned in the middle of the pull rod and used for placing a charging device, the upper part of the charger accommodating cavity is provided with an opening, chutes are arranged on both sides of the opening, and a cover used to cover or open the opening is arranged in the chutes.

2. The trolley case with a charging device according to claim 1, comprising:
elastic lugs on both sides of the cover, protrusions matched with the elastic lugs for limiting and locking the cover arranged on an inner side of an inner wall of the chutes,
a lug on an outer side of the inner wall of the chute that prevents the cover from completely out of the chute, and an arc-shaped protrusion on the cover.

3. The trolley case with a charging device according to claim 1, comprising an elastic piece accommodating cavity for installing an elastic piece is arranged at the bottom of the charger accommodating cavity, and a spring for ejecting the charging device is arranged in the elastic piece accommodating cavity.

4. The trolley case with a charging device according to claim 1, further comprising a buffer foam mounted on the inner wall of the charger accommodating cavity.

5. The trolley case with a charging device according to claim 1, wherein the case body is provided with an umbrella groove for placing umbrellas.

6. The trolley case with a charging device according to claim 1, wherein the cover is provided with a charging port for inserting a USB connector.

7. The trolley case with a charging device according to claim 1, wherein the traveling wheel mechanism comprises a front traveling wheel set arranged at both ends of the front side of the bottom of the case body and a rear traveling wheel set arranged at both ends of the rear side of the bottom of the case body, the rear traveling wheel set is provided with a driving mechanism for driving the rear traveling wheel set to roll, and the driving mechanism is connected with a button arranged on the case body for controlling a switch.

8. The trolley case with a charging device according to claim 7, wherein the front traveling wheel set is a universal wheel, the rear traveling wheel set is a directional wheel, the rear traveling wheel set comprises two rear traveling wheels respectively arranged at two ends of the rear side of the case body and a rotating shaft fixedly connected with the two rear traveling wheels, the rotating shaft is coaxially provided with a first sprocket, the driving mechanism comprises a driving motor arranged at the bottom of the case body and an output sprocket arranged on the driving motor, and the output sprocket is rotatably connected with the first sprocket to drive the first sprocket to rotate so as to drive the rear traveling wheel to roll.

9. The trolley case with a charging device according to claim 8, characterized in that comprising a micro generator arranged at the bottom of the case body, and the micro generator is electrically connected with the charging device so as to store electric energy in the charging device; the rotating shaft is also coaxially provided with a second sprocket, the micro generator is provided with an input sprocket, and the second sprocket is rotatably connected with the input sprocket to drive the input sprocket to rotate so as to drive the micro generator to generate electricity.

10. The trolley case with a charging device according to claim 1, wherein the trolley case further comprises a pressure sensor along a bottom portion of the case body for measuring the weight of the trolley case, a controller and a display along a top portion of the case body, wherein the pressure sensor is electrically connected with the controller for transmitting pressure signals to the controller, and the controller is electrically connected with the display for displaying the pressure signals received from the pressure sensor.

11. The trolley case with a charging device according to claim 1, wherein the middle of the bottom of the case body is rotatably provided with a measuring block, a pressure sensor is installed on the measuring block, the height of the measuring block is higher than the height of the traveling wheel mechanism and a display is arranged on the case body.

* * * * *